United States Patent
Chia et al.

(10) Patent No.: US 10,032,061 B2
(45) Date of Patent: Jul. 24, 2018

(54) INTELLIGENT TOUCH SENSING DEVICE

(71) Applicant: Rich IP Technology Inc., Taipei (TW)

(72) Inventors: Chung-Lin Chia, Taipei (TW);
Han-Chang Chen, Taipei (TW);
Jen-Chieh Chang, Taipei (TW);
Yen-Hung Tu, Taipei (TW)

(73) Assignee: RICH IP TECHNOLOGY INC., Taipei (TW)

( * ) Notice: Subject to any disclaimer, the term of this patent is extended or adjusted under 35 U.S.C. 154(b) by 24 days.

(21) Appl. No.: 15/398,671

(22) Filed: Jan. 4, 2017

(65) Prior Publication Data
US 2017/0206393 A1    Jul. 20, 2017

(30) Foreign Application Priority Data
Jan. 20, 2016    (TW) .............. 105101640 A

(51) Int. Cl.
*G06F 3/041* (2006.01)
*G06K 9/00* (2006.01)
*G06F 3/044* (2006.01)
*G06F 3/043* (2006.01)
*G06F 3/046* (2006.01)
*G06F 21/32* (2013.01)

(52) U.S. Cl.
CPC ............ *G06K 9/0002* (2013.01); *G06F 3/043* (2013.01); *G06F 3/044* (2013.01); *G06F 3/046* (2013.01); *G06F 3/0412* (2013.01); *G06F 3/0416* (2013.01); *G06F 21/32* (2013.01); *G06F 2203/04102* (2013.01); *G06F 2203/04103* (2013.01); *G06F 2203/04105* (2013.01); *G06F 2203/04106* (2013.01)

(58) Field of Classification Search
CPC ..... G06K 9/0002; G06F 21/32; G06F 3/0412; G06F 3/041; G06F 3/044; G06F 3/043; G06F 3/0416; G06F 3/046; G06F 2203/04103; G06F 2203/04102; G06F 2203/04106; G06F 2203/04105
See application file for complete search history.

(56) References Cited

U.S. PATENT DOCUMENTS

| 2014/0152610 A1* | 6/2014 | Suwald .............. G01D 5/24 345/174 |
| 2016/0299619 A1* | 10/2016 | Cheng ............... G06F 3/0412 |
| 2016/0342274 A1* | 11/2016 | Ye .................... G06F 3/044 |

* cited by examiner

Primary Examiner — Adam R Giesy
(74) Attorney, Agent, or Firm — Guice Patents PLLC

(57) ABSTRACT

An intelligent touch sensing device, including: a first electrode group having a first plurality of first electrodes; a second electrode group having a second plurality of second electrodes, each of the second electrodes being coupled with at least one active switch and the second plurality being larger than the first plurality; and a touch detection unit coupled with the first electrode group and with the second electrode group for performing a first touch detection procedure or performing the first detection procedure and then a second touch detection procedure as optionally required by an application program, the first touch detection procedure being acting on the first electrode group, and the second touch detection procedure being acting on at least one region of the second electrode group, wherein the at least one region is determined according to a detection result of the first touch detection procedure.

20 Claims, 21 Drawing Sheets m=X*Y, m>n m=X*Y , m>n

INTELLIGENT TOUCH SENSING DEVICE

BACKGROUND OF THE INVENTION

Field of the Invention

The present invention relates to a touch sensing device, especially to an intelligent touch sensing device.

Description of the Related Art

Please refer to FIG. 1, which illustrates a touch detection scheme of prior art using a plurality of polysilicon thin film transistors and a plurality of capacitive electrodes to form a fingerprint scan matrix on a glass substrate or a polymer substrate. As illustrated in FIG. 1, the polysilicon thin film transistors of the fingerprint scan matrix are sequentially driven to scan each of the capacitive electrodes, thereby deriving fingerprint matrix data.

However, when the fingerprint scan matrix is applied in high resolution or large size products, the scan time thereof will increase substantially due to a much increased number of detection points. Besides, if the fingerprint scan matrix is stacked on a display, the light transmittance rate of the display will be compromised, so generally the fingerprint scan matrix is installed at a zone outside the display (as shown in FIG. 1) for identity authentication via fingerprint detection.

Please refer to FIG. 2, which illustrates another touch detection scheme of prior art using a plurality of common electrodes of a display to form a touch scan matrix. As illustrated in FIG. 2, to wire the touch scan matrix, a large number of conductors and connecting pads have to be installed thereon. When the touch scan matrix is required to possess a high resolution or a large matrix size, the scan time thereof will increase substantially due to a much increased number of detection points, and when the touch scan matrix possesses a high resolution, the pattern of the common electrodes may overlap the pattern of pixel electrodes of the display to result in a moiré effect, thereby degrading the display quality thereof.

That is, when a touch module is required to provide a high resolution touch detection function, the efficiencies of traditional touch detection schemes remain room to be improved, and when a touch display module is required to provide both a high resolution display and a high resolution touch detection function, traditional touch display schemes are hard to achieve both the high resolution touch detection function and the high resolution display quality.

To solve the foregoing problems, a novel touch sensing device is needed.

SUMMARY OF THE INVENTION

One objective of the present invention is to disclose an intelligent touch sensing device, which is capable of integrating a high resolution active type sensing structure and a low resolution passive type sensing structure into a touch detection device, so as to perform a first touch detection procedure and/or a second touch detection procedure as optionally required by an application program.

Another objective of the present invention is to disclose an intelligent touch sensing device, which is capable of providing fingerprint data or fingerprint characteristic data.

Another objective of the present invention is to disclose an intelligent touch sensing device, which is capable of providing sensed pressure data.

Another objective of the present invention is to disclose an intelligent touch sensing device, which is capable of utilizing existing control lines, signal lines, transistor switches, pixel electrodes, and counter electrodes of a matrix display structure to perform a touch detection procedure, thereby providing a high yield rate and low cost touch sensing device.

Another objective of the present invention is to disclose an intelligent touch sensing device, which is capable of providing a joystick style operation zone within a touch detection area.

Still another objective of the present invention is to disclose an intelligent touch sensing device, which is capable of being implemented in a form of a curved touch sensing device or a flexible or foldable touch sensing device by utilizing a manufacturing process for organic transistors and a flexible substrate.

To attain the foregoing objectives, an intelligent touch sensing device is proposed, including:

a first electrode group having a first plurality of first electrodes;

a second electrode group having a second plurality of second electrodes, each of the second electrodes being controlled by at least one active switch to determine whether to couple with a touch sensing signal, and the second plurality being larger than the first plurality; and a touch detection unit coupled with the first electrode group and the second electrode group, used for operating according to an application program to optionally perform a first touch detection procedure on the first electrode group, perform a second touch detection procedure on the second electrode group, or perform the first detection procedure on the first electrode group and then perform the second touch detection procedure on at least one region of the second electrode group, wherein the at least one region is determined according to a detection result of the first touch detection procedure.

In one embodiment, the first electrode group and the second electrode group are on a same plane, and the first touch detection procedure is a first acoustic wave type touch detection procedure or a first capacitive type touch detection procedure or a first electromagnetic induction type touch detection procedure, and the second touch detection procedure is a second acoustic wave type touch detection procedure or a second capacitive type touch detection procedure or a second electromagnetic induction type touch detection procedure.

In one embodiment, the first electrode group and the second electrode group are on different planes, and the first touch detection procedure is a first acoustic wave type touch detection procedure or a first capacitive type touch detection procedure or a first electromagnetic induction type touch detection procedure, and the second touch detection procedure is a second acoustic wave type touch detection procedure or a second capacitive type touch detection procedure or a second electromagnetic induction type touch detection procedure.

In one embodiment, the touch detection unit outputs first touch sensed data of the first electrode group and/or second touch sensed data of the second electrode group, and/or fusion data of the first touch sensed data and the second touch sensed data.

In one embodiment, both the first touch sensed data and the second touch sensed data are touch coordinate data.

In one embodiment, the first touch sensed data are touch coordinate data and the second touch sensed data are raw data of sensed values that are generated without going through a touch coordinate determining procedure.

In one embodiment, both the first touch sensed data and the second touch sensed data are raw data of sensed values that are generated without going through a touch coordinate determining procedure.

In one embodiment, both the first touch sensed data and the second touch sensed data are processed data of raw data of sensed values.

In one embodiment, the application program is a fingerprint detection program, and the touch detection unit generates fingerprint data after executing the fingerprint detection program, wherein, the fingerprint data are raw data derived after the touch detection unit executes the first touch detection procedure and the second touch detection procedure, the raw data being not coordinate data generated by a touch coordinate determining procedure; or the fingerprint data are processed data derived after the touch detection unit executes the first touch detection procedure, the second touch detection procedure, and a fingerprint characteristics retrieving procedure.

In one embodiment, the application program is a pressure detection program for generating pressure value data and/or pressure vector data according to raw data of sensed values derived after performing the first touch detection procedure and the second touch detection procedure, the raw data being generated without going through a touch coordinate determining procedure.

In one embodiment, the touch detection unit generates pressure value data and/or coordinate data according to a detection result of the first touch detection procedure, and generates fingerprint data and/or fingerprint characteristics data according to a detection result of the second touch detection procedure.

In one embodiment, the touch detection unit generates coordinate data according to a detection result of the first touch detection procedure, and generates fingerprint characteristics data and/or pressure value data according to a detection result of the second touch detection procedure.

To attain the foregoing objectives, another intelligent touch sensing device is proposed, including:

a first electrode group having a first plurality of first electrodes;

an active matrix unit having a second plurality of second electrodes, each of the second electrodes being addressable by at least one active switch to serve as a display electrode or a touch sensing electrode, wherein the second plurality is larger than the first plurality;

a display material layer corresponding with a plurality of pixel units, used to be driven by the active matrix unit with voltage signals or current signals to provide a display image during a display procedure; and a touch detection unit coupled with the first electrode group and the active matrix unit, used for operating according to an application program to optionally perform a first touch detection procedure on the first electrode group, perform a second touch detection procedure on the active matrix unit, or perform the first detection procedure on the first electrode group and then perform the second touch detection procedure on at least one region of the active matrix unit, wherein the at least one region is determined according to a detection result of the first touch detection procedure.

In one embodiment, the first electrode group and the active matrix unit are on a same plane.

In one embodiment, the first electrode group and the active matrix unit are on different planes.

In one embodiment, the touch detection unit performs the first touch detection procedure on a plurality of the first electrodes corresponding to a plurality of the pixel units not yet driven during the display procedure, the pixel units being set to be sequentially driven during the display procedure.

In one embodiment, the first electrodes and the second electrodes are coupled to the touch detection unit and a display driving unit via a multiplexing circuit or a bus circuit, and the first electrodes and the second electrodes are located at two different sides or a same side of the display material layer.

In one embodiment, the touch detection unit outputs first touch sensed data of the first electrode group and/or second touch sensed data of the active matrix unit, wherein, both the first touch sensed data and the second touch sensed data are touch coordinate data, or the first touch sensed data are touch coordinate data and the second touch sensed data are raw data of sensed values that are generated without going through a touch coordinate determining procedure, or both the first touch sensed data and the second touch sensed data are raw data of sensed values that are generated without going through a touch coordinate determining procedure.

In one embodiment, the application program is a fingerprint detection program, and the touch detection unit generates fingerprint data after executing the fingerprint detection program, wherein, the fingerprint data are raw data derived after the touch detection unit executes the first touch detection procedure and the second touch detection procedure, the raw data being not coordinate data generated by a touch coordinate determining procedure; or the fingerprint data are processed data derived after the touch detection unit executes the first touch detection procedure, the second touch detection procedure, and a fingerprint characteristics retrieving procedure.

In one embodiment, the application program is a pressure detection program for generating pressure value data and/or pressure vector data according to raw data of sensed values derived after performing the first touch detection procedure and the second touch detection procedure, the raw data being generated without going through a touch coordinate determining procedure.

In one embodiment, the touch detection unit generates pressure value data and/or coordinate data according to a detection result of the first touch detection procedure, and generates fingerprint data and/or fingerprint characteristics data according to a detection result of the second touch detection procedure.

In one embodiment, the touch detection unit generates coordinate data according to a detection result of the first touch detection procedure, and generates fingerprint characteristics data and/or pressure value data according to a detection result of the second touch detection procedure.

In one embodiment, the first touch detection procedure is a first acoustic wave type touch detection procedure or a first capacitive type touch detection procedure, and the second touch detection procedure is a second acoustic wave type touch detection procedure or a second capacitive type touch detection procedure.

In one embodiment, the first electrode group and the active matrix unit are used for detecting a touch operation on a single touch zone of the intelligent touch sensing device, or for detecting two touch operations separately on a first touch zone and a second touch zone of the intelligent touch sensing device, and the first touch zone and the second touch zone are on a same plane or on different planes.

In one embodiment, the touch detection unit performs a data fusion procedure on first touch sensed data derived from the first electrode group and on second touch sensed data derived from the active matrix unit to generate data of a fusion image, wherein both the first touch sensed data and the second touch sensed data are raw data of sensed values generated without going through a touch coordinate determining procedure.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
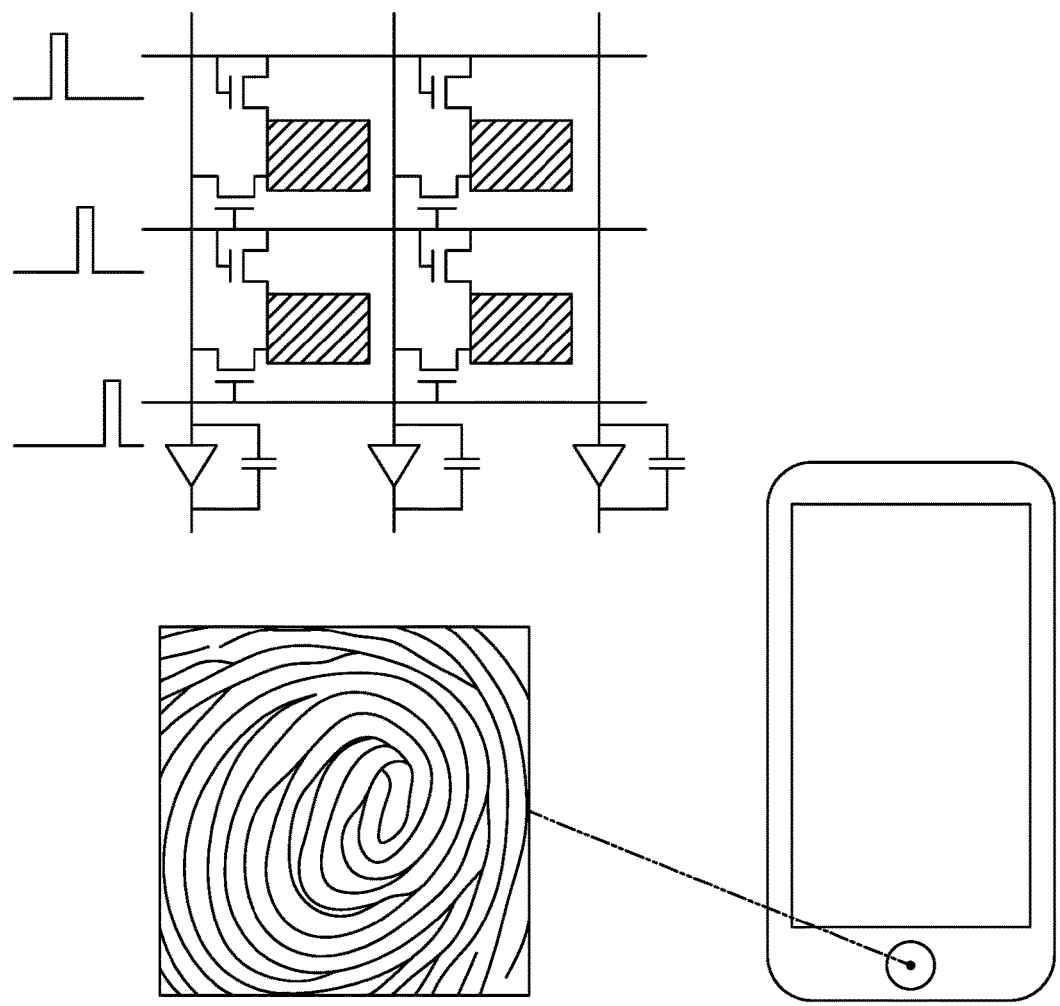
FIG. 1 illustrates a touch detection scheme of prior art using a plurality of polysilicon thin film transistors and a plurality of capacitive electrodes to form a fingerprint scan matrix on a glass substrate or a polymer substrate.
Figure 2:
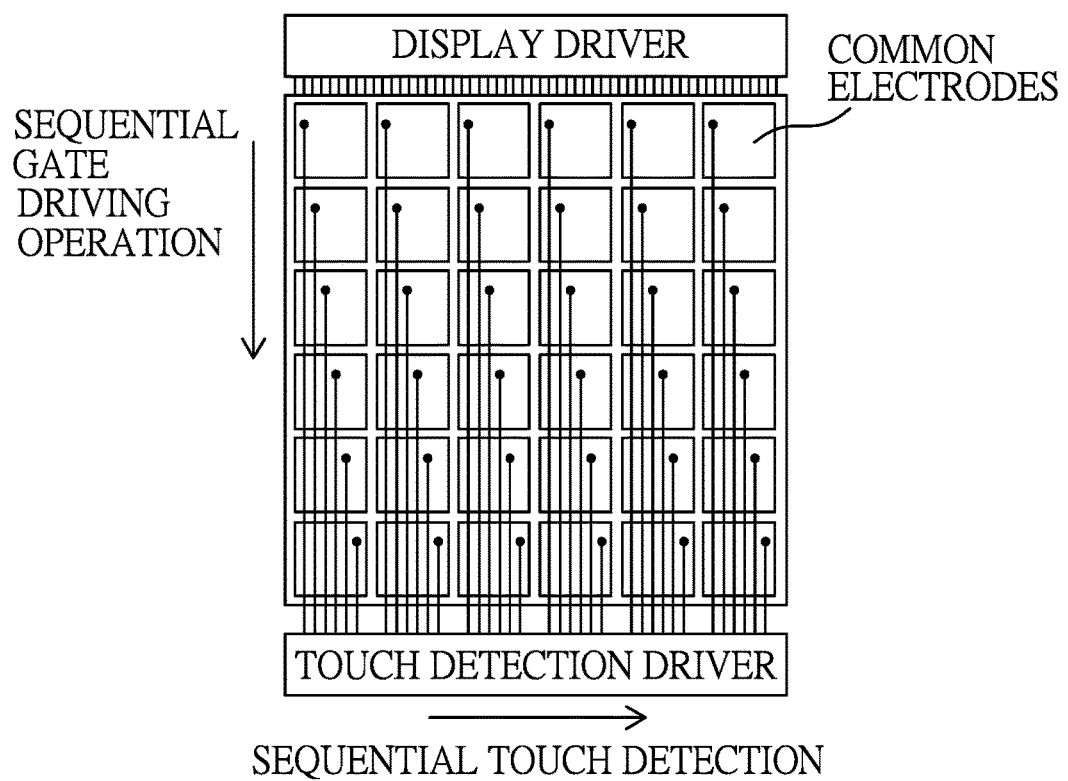
FIG. 2 illustrates another touch detection scheme of prior art using a plurality of common electrodes of a display to form a touch scan matrix.
Figure 3:
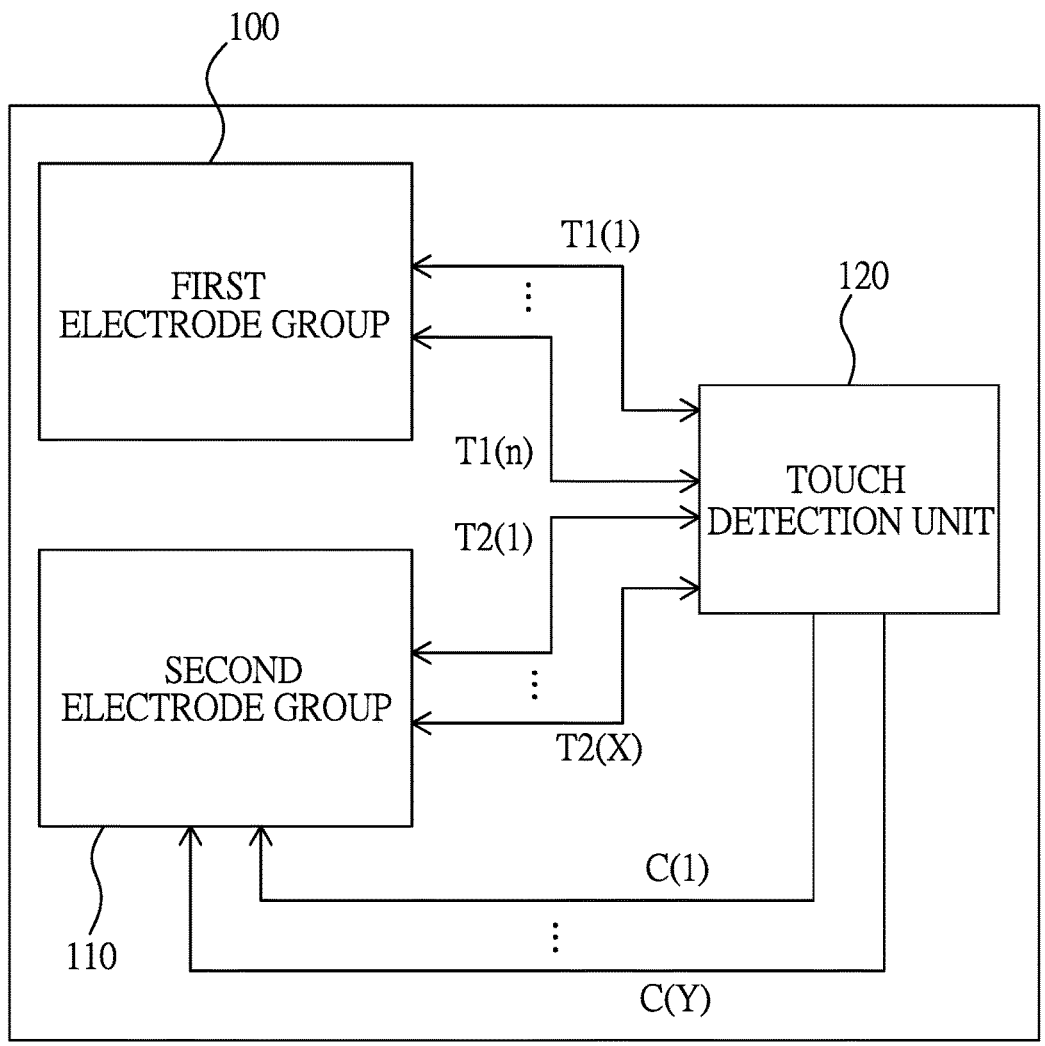
FIG. 3 illustrates a block diagram of an intelligent touch sensing device according to an embodiment of the present invention.
Figure 4A:
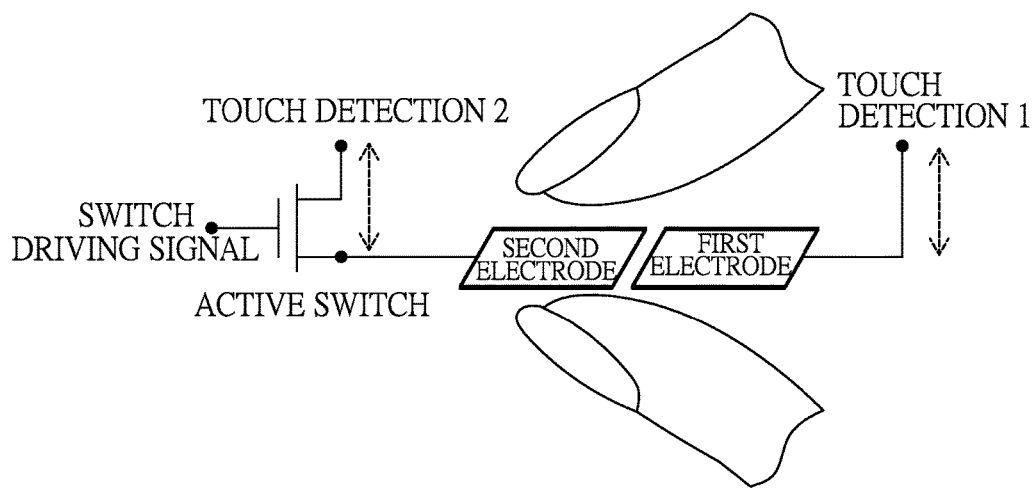
FIG. 4a-4f illustrates 6 embodiments of the first electrode group and the second electrode group of the intelligent touch sensing device of FIG. 3.
Figure 4B:
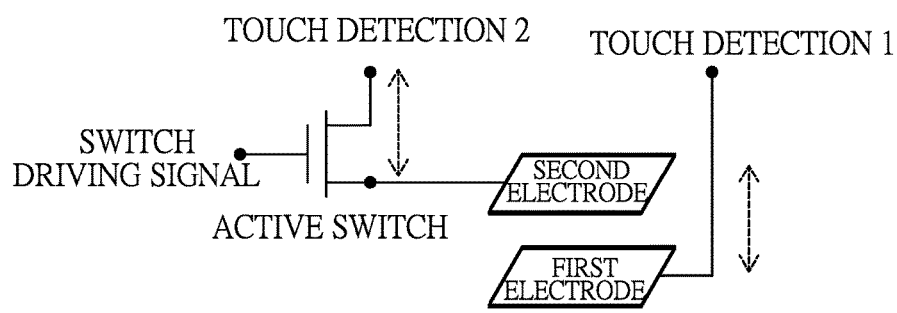
Figure 4C:
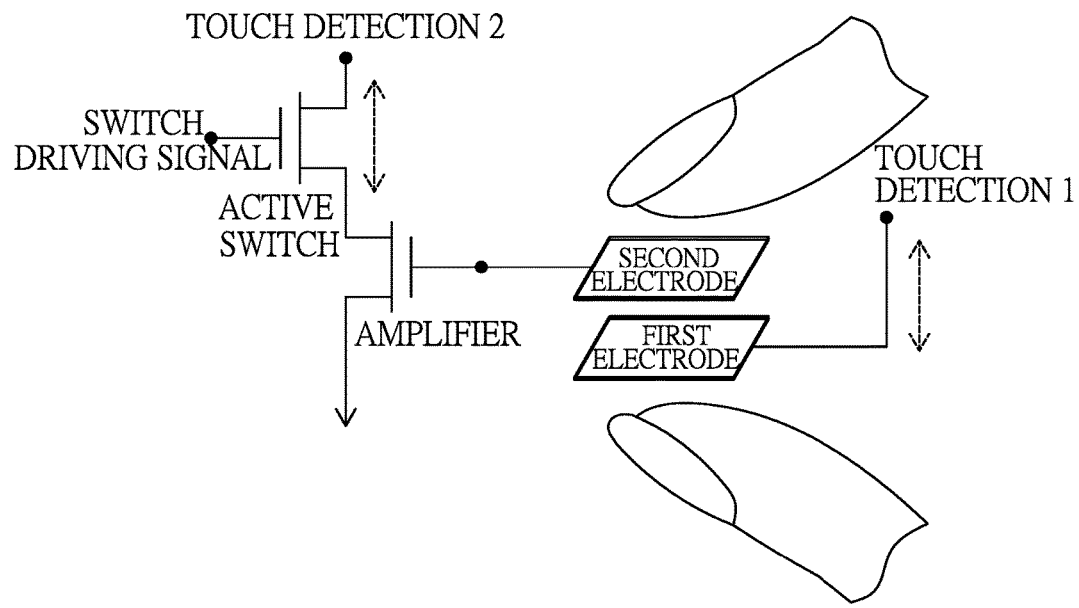
Figure 4D:
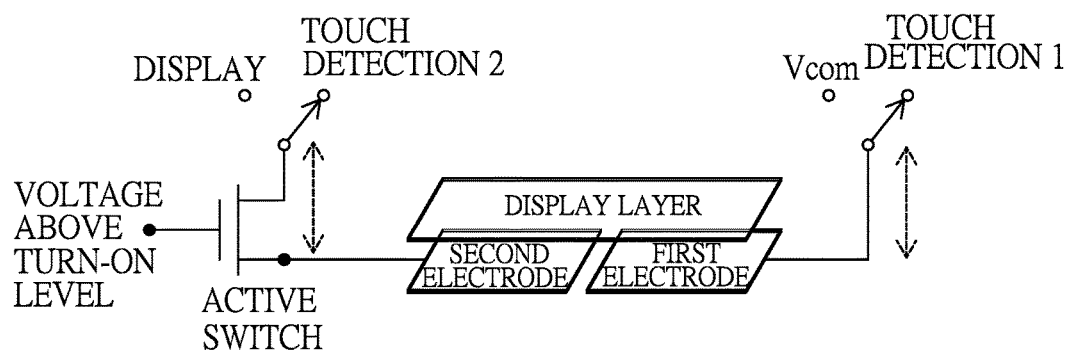
Figure 4E:
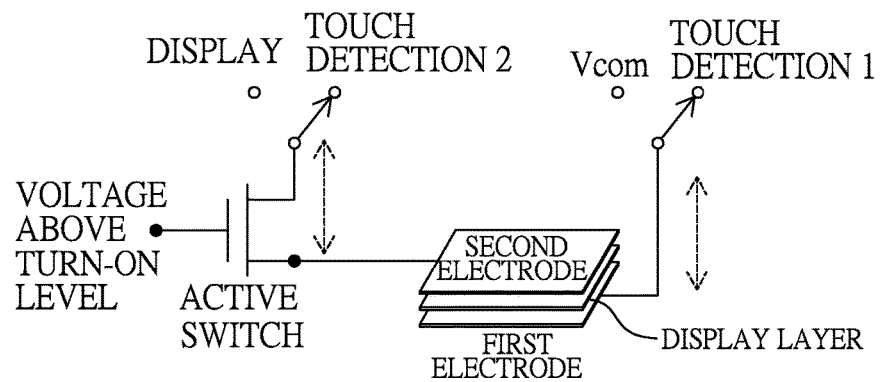
Figure 4F:
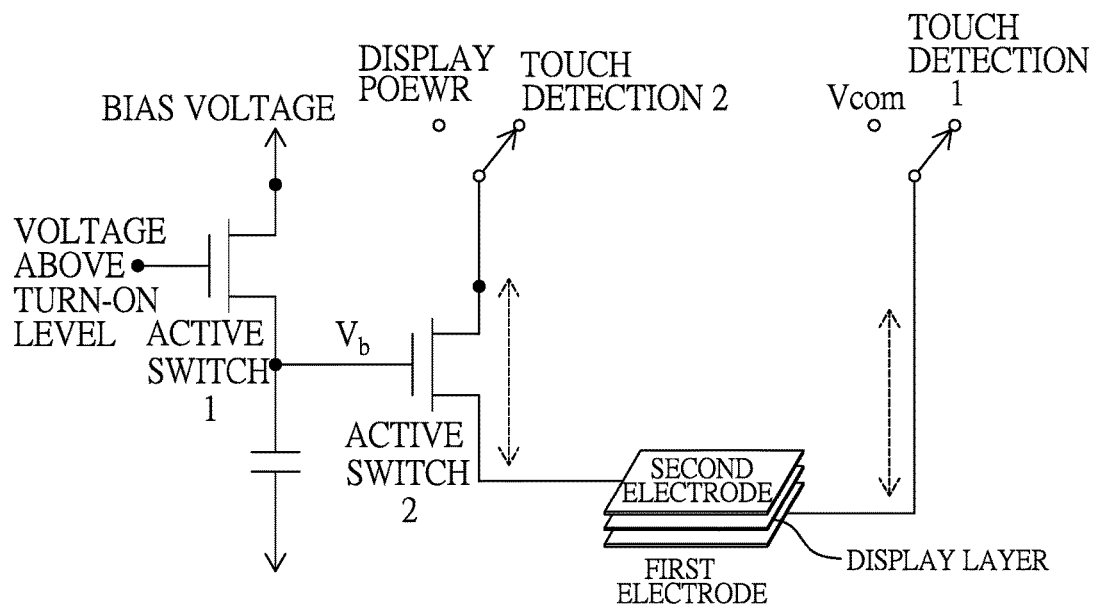
Figure 5A:
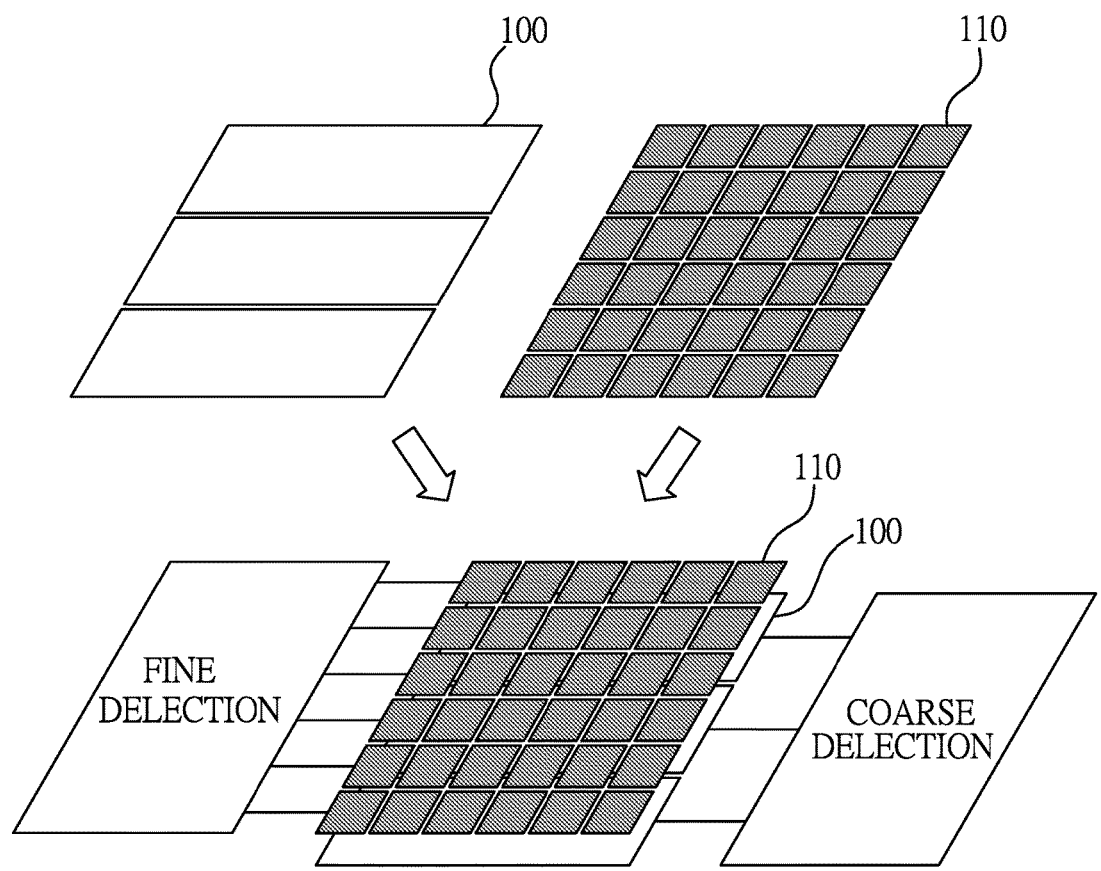
FIG. 5a-5b illustrates a scenario that the first electrode group and the second electrode group of the intelligent touch sensing device of FIG. 3 are on different planes and a scenario that the first electrode group and the second electrode group of the intelligent touch sensing device of FIG. 3 are on a same plane.
Figure 5B:
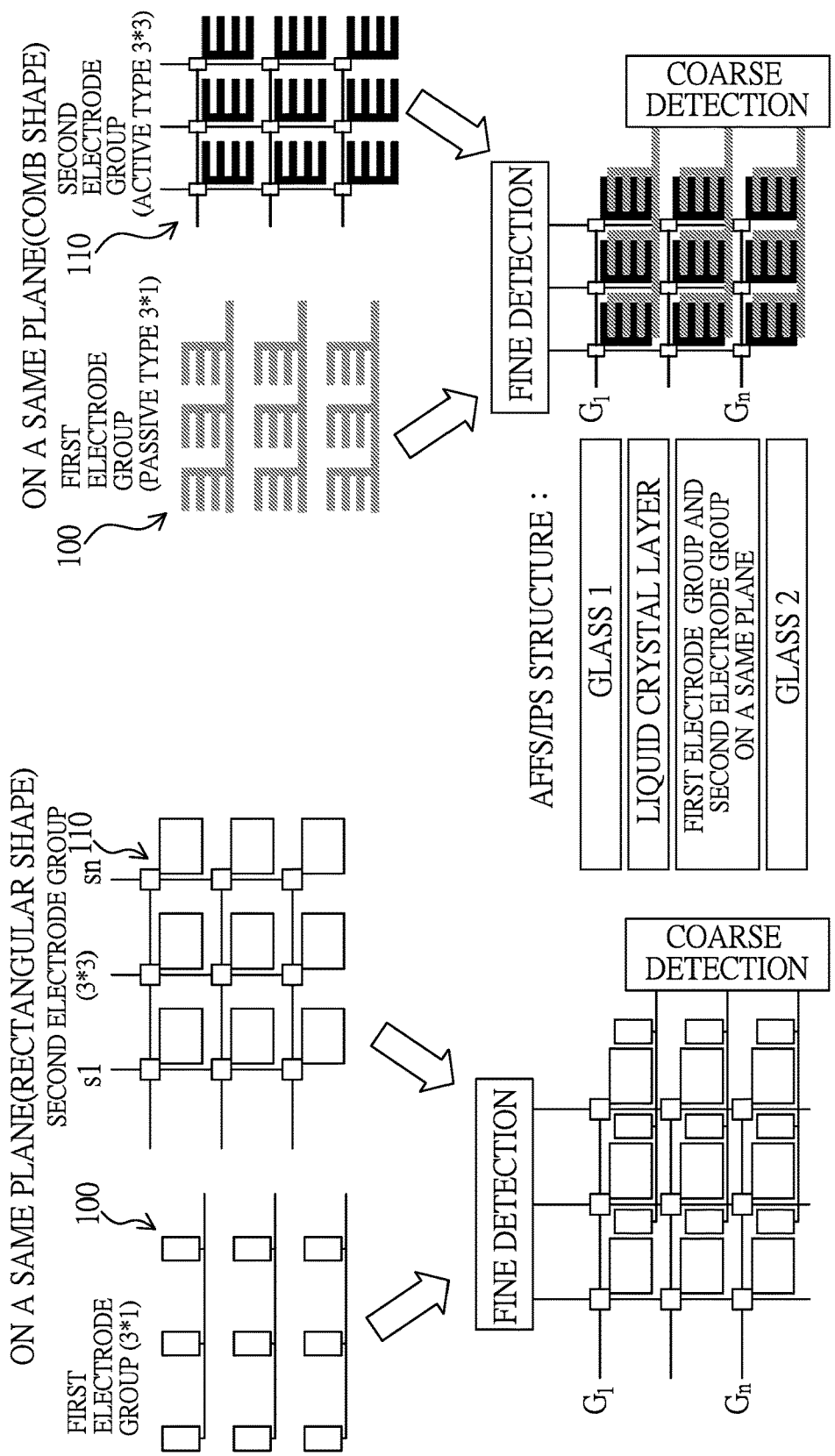
Figure 6A:
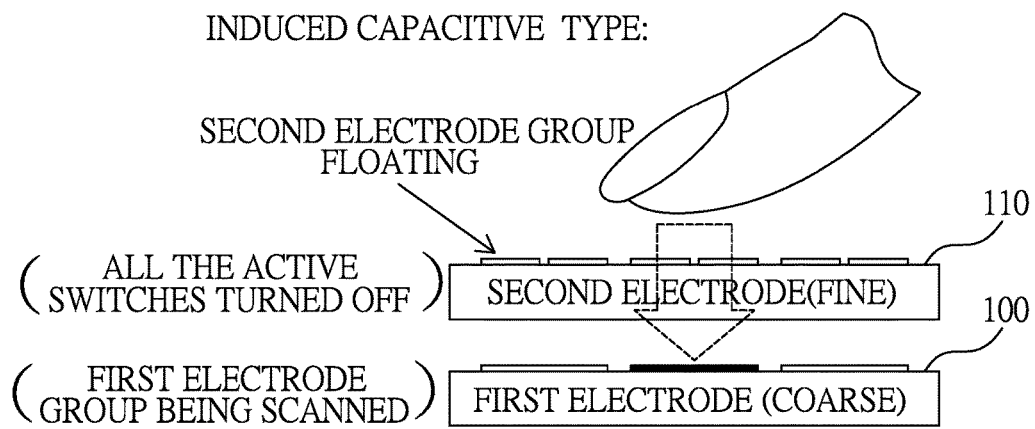
FIG. 6a-6j illustrates scenarios that the intelligent touch sensing device of FIG. 3 provides single-side touch operation or double-sides touch operation, and the first electrode group and the second electrode group use same type of touch detection scheme or different types of touch detection scheme.
Figure 6B:
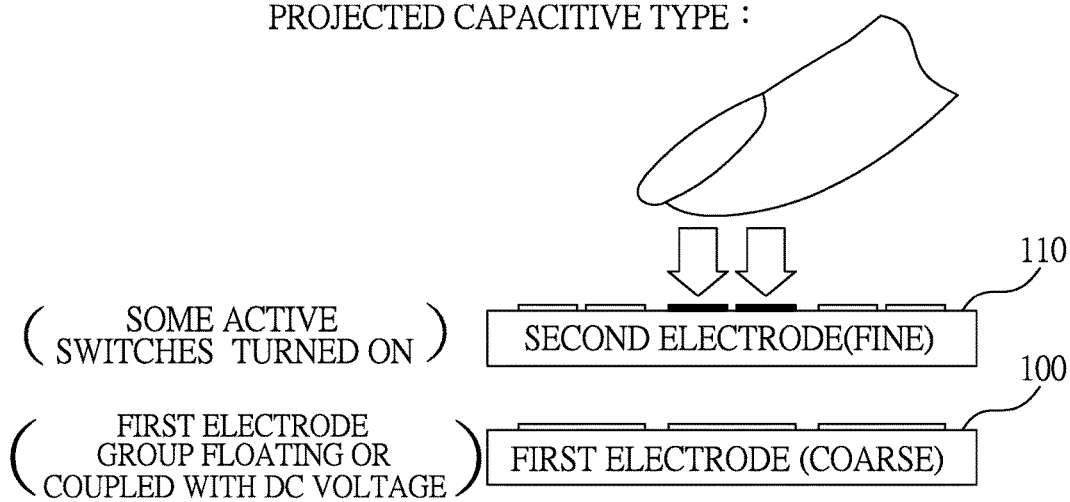
Figure 6C:
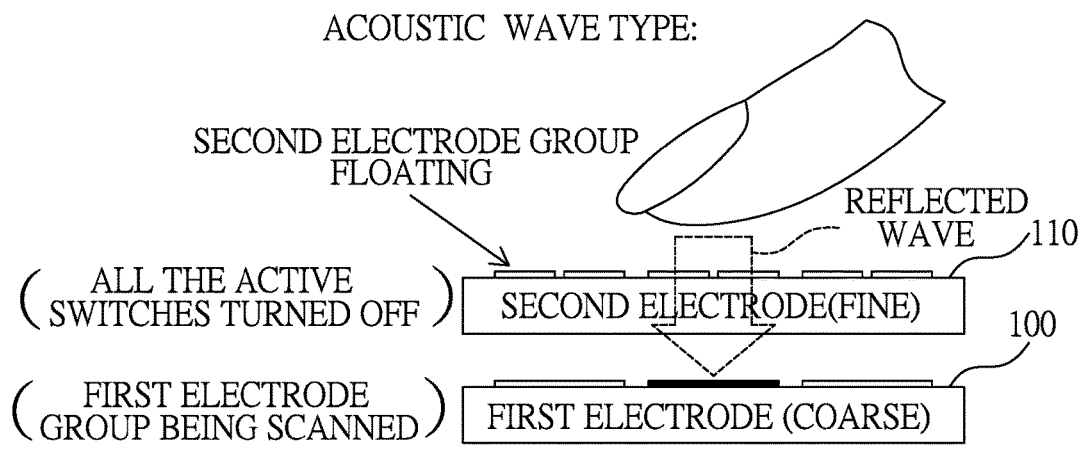
Figure 6D:
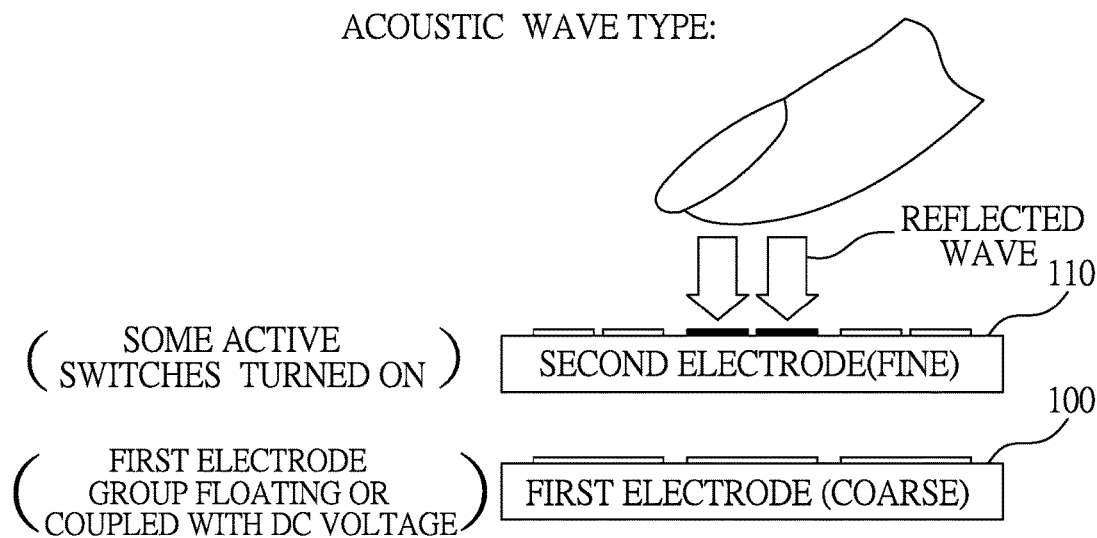
Figure 6E:
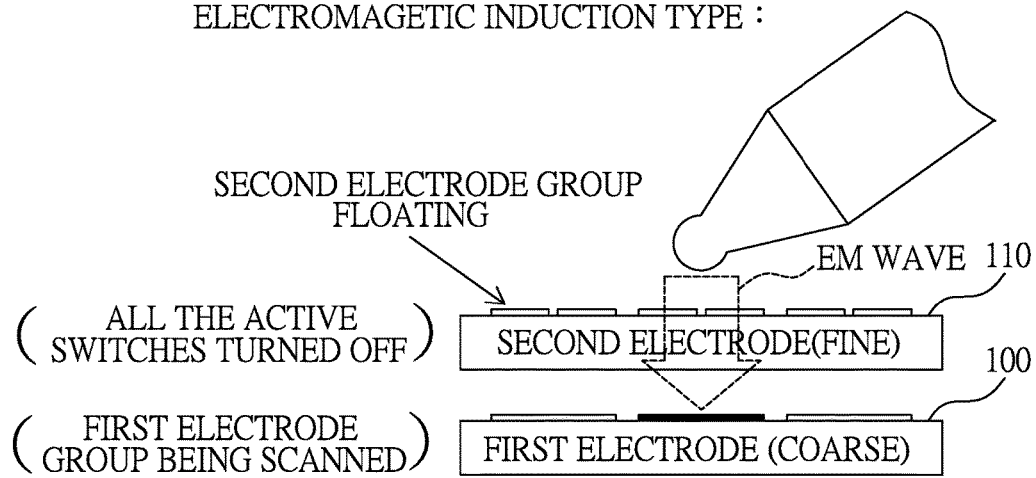
Figure 6F:
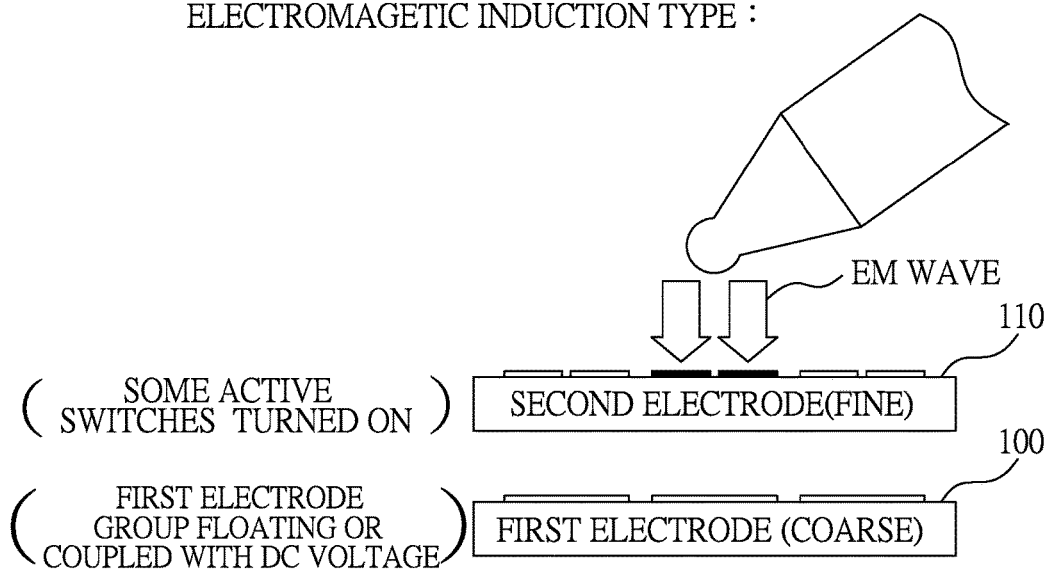
Figure 6G:
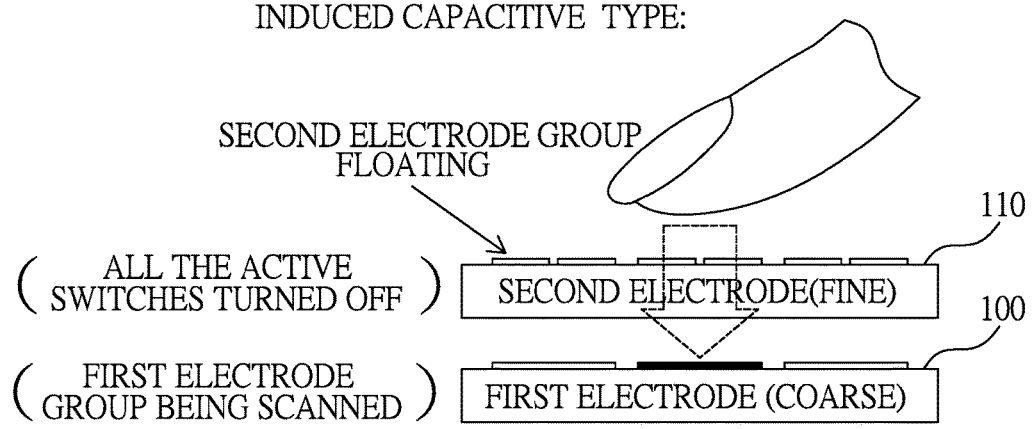
Figure 6H:
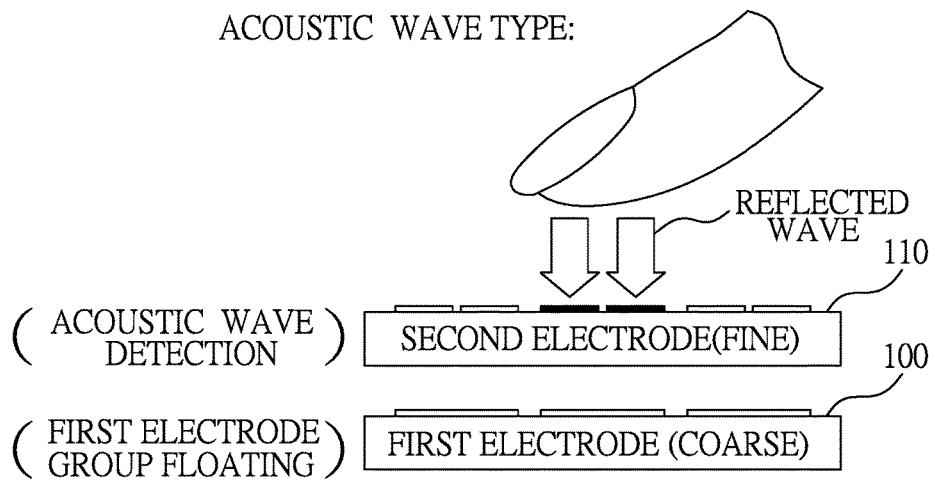
Figure 6I:
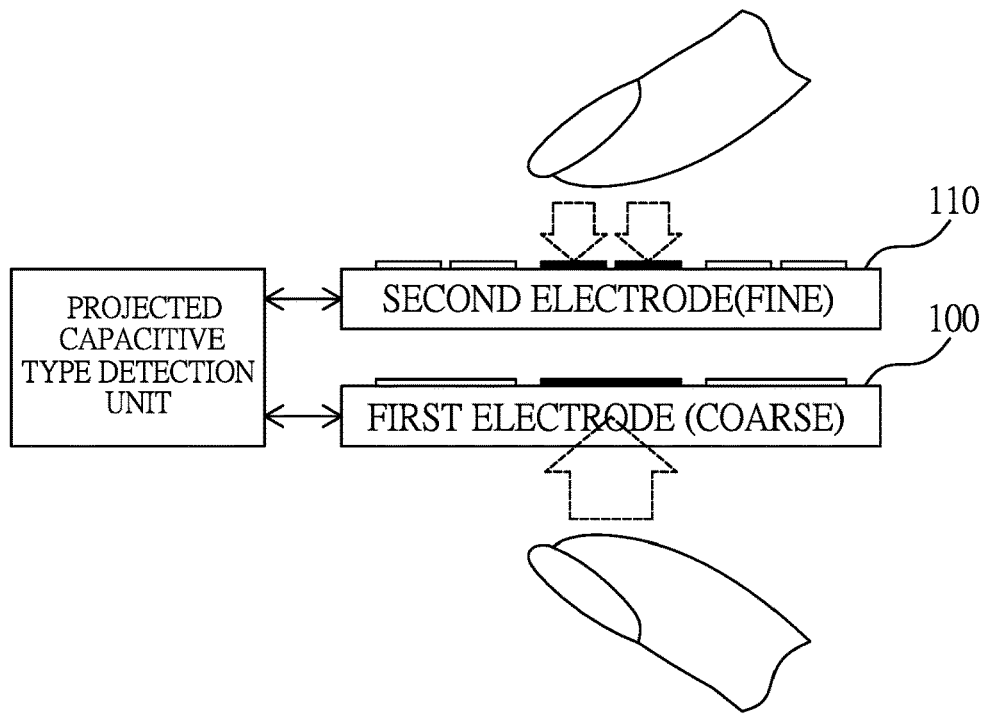
Figure 6J:
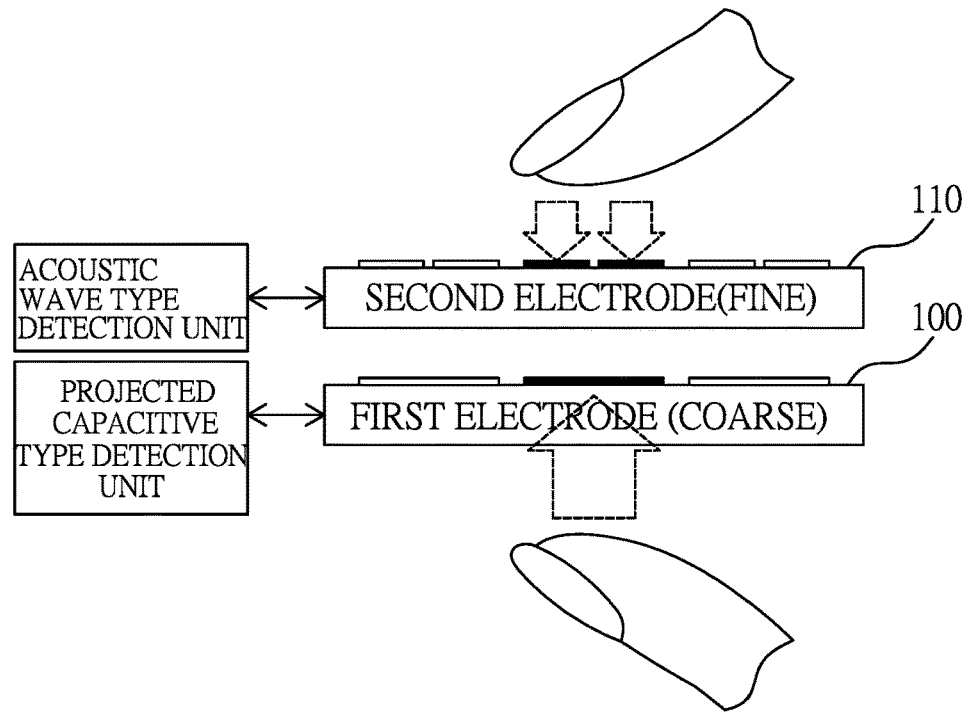

Please refer to FIG. 3, which illustrates a block diagram of an intelligent touch sensing device according to an embodiment of the present invention. As illustrated in FIG. 3, the intelligent touch sensing device includes a first electrode group 100, a second electrode group 110, and a touch detection unit 120.

The first electrode group 100 has a first plurality (n) of first electrodes coupled to the touch detection unit 120 via conductive lines T1(1)-T1(n), n being a positive integer.

The second electrode group 110 has a second plurality (m) of second electrodes, each of the second electrodes being under a control of at least one active switch to couple with a touch detection signal transmitted via conductive lines T2(1)-T2(X), X being a positive integer. The active switches are driven by control signals C(1)-C(Y), Y being a positive integer, and the second plurality (m=X*Y) being larger than the first plurality (n). Please refer to FIG. 4a-4f, which illustrates 6 embodiments of the first electrode group and the second electrode group. As illustrated in FIG. 4a-4f, each of the second electrodes of the second electrode group 110 is addressable under the control of at least one active switch.

The touch detection unit 120, coupled with the first electrode group 100 and the second electrode group 110, is used for operating according to an application program to optionally perform a first touch detection procedure on the first electrode group 100, perform a second touch detection procedure on the second electrode group 110, or perform the first detection procedure on the first electrode group 100 and then perform the second touch detection procedure on at least one region of the second electrode group 110, wherein the at least one region is determined according to a detection result of the first touch detection procedure so as to greatly reduce the workload of the touch detection unit 120.

The first electrode group 100 and the second electrode group 110 can be on a same plane or on different planes. Please refer to 5a-5b, which illustrates respectively a scenario that the first electrode group 100 and the second electrode group 110 are on different planes and a scenario that the first electrode group 100 and the second electrode group 110 are on a same plane. Besides, the first electrode and the second electrode can be of a rectangular shape or a comb shape.

The first touch detection procedure can be a first acoustic wave type touch detection procedure or a first capacitive type touch detection procedure or a first electromagnetic induction type touch detection procedure, and the second touch detection procedure can be a second acoustic wave type touch detection procedure or a second capacitive type touch detection procedure or a second electromagnetic induction type touch detection procedure. Please refer to FIG. 6a-6j, which illustrates scenarios that the first electrode group 100 and the second electrode group 110 use capacitive type touch detection procedure or electromagnetic induction type touch detection procedure or acoustic wave type touch detection procedure for touch detection, the capacitive type touch detection procedure can be an induced capacitive type touch detection procedure or a projected capacitive type touch detection procedure. As illustrated in FIG. 6a-6j, the present invention can provide single-side touch operation or double-sides touch operation, and the first electrode group 100 and the second electrode group 110 can have a same touch detection scheme or different touch detection schemes.

The touch detection unit 120 outputs data $D_{OUT}$, which can include first touch sensed data of the first electrode group 100 and/or second touch sensed data of the second electrode group 110, and/or fusion data of the first touch sensed data and the second touch sensed data.

The fusion data can be formed with the first touch sensed data having a first bit number per data for representing a first grayscale resolution and the second touch sensed data having a second bit number per data for representing a second grayscale resolution, wherein the first bit number is larger than the second bit number, so that the fusion data can provide enough sensed touch information with a minimum total bit number. As the first touch sensed data are derived from the first electrode group 100, the second touch sensed data are derived from the second electrode group 110, the quantity of the first touch sensed data is smaller than the quantity of the second touch sensed data, and by making the second bit number per data smaller than the first bit number per data, the total bit number for representing the fusion data can be greatly reduced. For example, if the first electrode group 100 has 20 said first electrodes and the first touch sensed data have 8 bits per data representing 256 gray scales, and the second electrode group 110 has 1000 said second electrodes and the second touch sensed data have 1 bit per data representing 2 gray scales, then the total bit number of all the first touch sensed data and all the second touch sensed data will be equal to 8×20+1×1000=1160, and the fusion data derived by performing a fusion operation on the first touch sensed data and the second touch sensed data can provide an effect of a high resolution or large gray levels substantially equivalent to the effect of 1000 8-bit data. On the other hand, although directly using 8-bit (256 gray levels) per data to represent the second touch sensed data can provide more detailed touch sensed information, however, the total bit count thereof will be 8×1000=8000, much larger than the total bit count (1160) required of the present invention.

The first touch sensed data and the second touch sensed data can both be touch coordinate data, or the first touch sensed data be touch coordinate data and the second touch sensed data be raw data of sensed values that are generated without going through a touch coordinate determining procedure (the raw data of sensed values can be digital data derived from a conversion operation on an analog sensed value of a touch sensing point, and a signal processing operation including a filtering operation and/or a gain adjustment operation can be included or not included in the conversion operation), or both the first touch sensed data and the second touch sensed data are raw data of sensed values that are generated without going through a touch coordinate determining procedure, or both the first touch sensed data and the second touch sensed data are processed data of the raw data of sensed values.

The application program can be a fingerprint detection program, and the touch detection unit 120 generates fingerprint data after executing the fingerprint detection program, wherein, the fingerprint data can be raw data derived after the touch detection unit 120 executes the first touch detection procedure and the second touch detection procedure, the raw data being not coordinate data generated by a touch coordinate determining procedure; or the fingerprint data be processed data derived after the touch detection unit 120 executes the first touch detection procedure, the second touch detection procedure, and a fingerprint characteristics retrieving procedure.

The application program can also be a pressure detection program, which is capable of generating pressure value data and/or pressure vector data according to a size of touched area or a total sensed value calculated from raw data of sensed values derived after performing the first touch detection procedure and the second touch detection procedure, the raw data being generated without going through a touch coordinate determining procedure.

The touch detection unit 120 can generate pressure value data and/or coordinate data according to a detection result of the first touch detection procedure, and generate fingerprint data and/or fingerprint characteristics data according to a detection result of the second touch detection procedure; or generate coordinate data according to a detection result of the first touch detection procedure, and generate fingerprint characteristics data and/or pressure value data according to a detection result of the second touch detection procedure.

Figure 7:
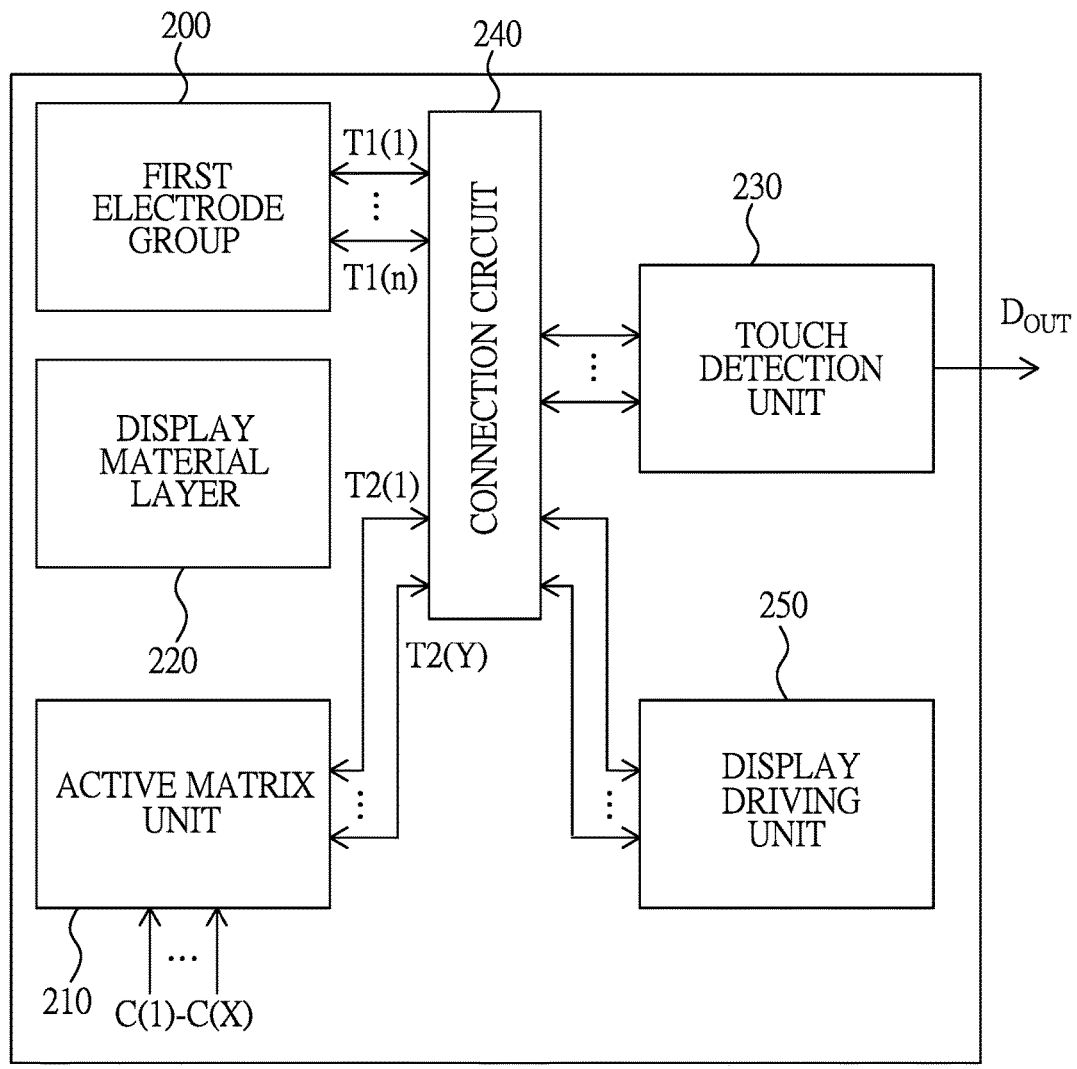
FIG. 7 illustrates a block diagram of an intelligent touch sensing device according to another embodiment of the present invention.

Please refer to FIG. 7, which illustrates a block diagram of an intelligent touch sensing device according to another embodiment of the present invention. As illustrated in FIG. 7, the intelligent touch sensing device includes a first electrode group 200, an active matrix unit 210, a display material layer 220, a touch detection unit 230, a connection circuit 240, and a display driving unit 250.

The first electrode group 200 has a first plurality of first electrodes coupled to the touch detection unit 230 or the display driving unit 250 via conductive lines T1(1)-T1($n$) and the connection circuit 240, n being a positive integer.

The active matrix unit 210 has a second plurality (m) of second electrodes and each of the second electrodes is addressable by at least one switch and is coupled to the touch detection unit 230 to serve as a touch sensing electrode or coupled to the display driving unit 250 to serve as a display electrode via conductive lines T2(1)-T2(X) and the connection circuit 240, where X is a positive integer, and the active switches are driven by control signals C(1)-C(Y), Y being a positive integer, and the second plurality (m=X*Y) being larger than the first plurality (n).

Figure 8A:
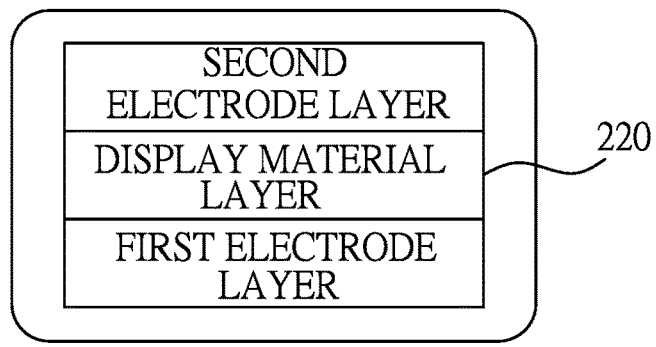
FIG. 8a-8c illustrates scenarios that the display material layer of the intelligent touch sensing device of FIG. 7 is located between, above, or below the first electrode and the second electrode.
Figure 8B:
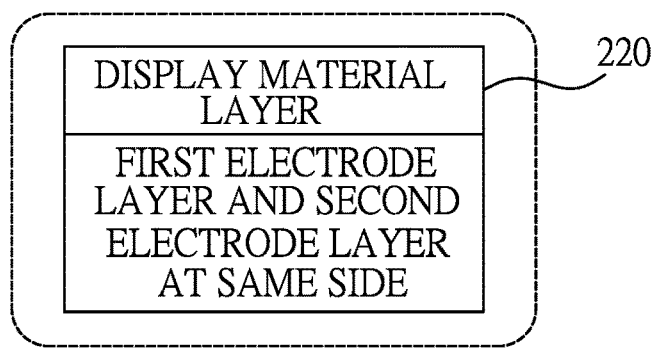
Figure 8C:
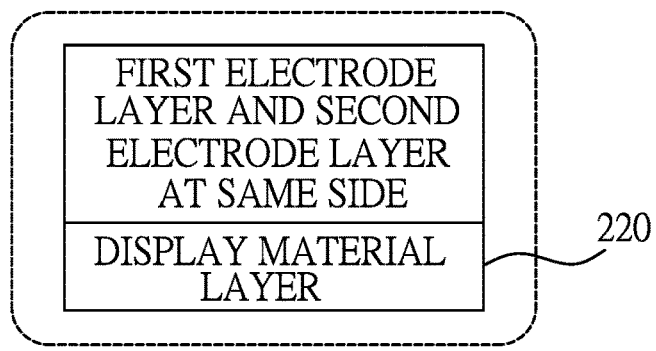

The display material layer 220 is corresponding with a plurality of pixel units and is used to be driven by the active matrix unit 210 with voltage signals or current signals to provide a display image during a display procedure. For different applications, as shown in FIG. 8$a$-8$c$, the first electrodes and the second electrodes can be located at two different sides or a same side of the display material layer 220. Besides, the first electrode and the second electrode can be of a rectangular shape or a comb shape.

The touch detection unit 230 is coupled with the first electrode group 200 and with the active matrix unit 210 via the connection circuit 240 for performing a first touch detection procedure on the first electrode group 200 or performing a second touch detection procedure on the active matrix unit 210 or performing the first detection procedure on the first electrode group 200 and then the second touch detection procedure on at least one region of the active matrix unit 210 as optionally required by an application program, wherein the at least one region is determined according to a detection result of the first touch detection procedure so as to greatly reduce the workload of the touch detection unit 230.

The first electrode group 200 and the active matrix unit 210 can be on a same plane or on different planes.

The touch detection unit 230 can perform the first touch detection procedure on a plurality of the first electrodes corresponding to a plurality of the pixel units not yet driven during the display procedure, the pixel units being set to be sequentially driven during the display procedure. That is, the first touch detection procedure can be embedding into the display procedure. Besides, the touch detection unit 230 can also interleave the first touch detection procedure and/or the second touch detection procedure with the display procedure in the time domain.

The connection circuit 240 can be a multiplexing circuit or a bus circuit to couple the first electrode group 200 and the active matrix unit 210 to the touch detection unit 230 or to the display driving unit 250, so as to provide a touch detection function and a display function. Besides, the touch detection unit 230 and the display driving unit 250 can be integrated into a chip, or the touch detection unit 230, the display driving unit 250, and the connection circuit 240 can be integrated into a chip.

The touch detection unit 230 outputs data $D_{OUT}$, which can include first touch sensed data of the first electrode group 200 and/or second touch sensed data of the active matrix unit 210, wherein both the first touch sensed data and the second touch sensed data can be touch coordinate data, or the first touch sensed data be touch coordinate data and the second touch sensed data be raw data of sensed values that are generated without going through a touch coordinate determining procedure, or both the first touch sensed data and the second touch sensed data be raw data of sensed values that are generated without going through a touch coordinate determining procedure.

The application program can be a fingerprint detection program, and the touch detection unit 230 generates fingerprint data after executing the fingerprint detection program, wherein, the fingerprint data can be raw data of sensed values derived after the touch detection unit 230 executes the first touch detection procedure and the second touch detection procedure, the raw data being not coordinate data generated by a touch coordinate determining procedure; or the fingerprint data can be processed data derived after the touch detection unit 230 executes the first touch detection procedure, the second touch detection procedure, and a fingerprint characteristics retrieving procedure.

The application program can also be a pressure detection program, which is capable of generating pressure value data and/or pressure vector data according to a size of touched area or a total sensed value calculated from raw data of sensed values derived after performing the first touch detection procedure and the second touch detection procedure, the raw data being generated without going through a touch coordinate determining procedure.

The touch detection unit 230 can generate pressure value data and/or coordinate data according to a detection result of the first touch detection procedure, and generate fingerprint data and/or fingerprint characteristics data according to a detection result of the second touch detection procedure; or generate coordinate data according to a detection result of the first touch detection procedure, and generate fingerprint characteristics data and/or pressure value data according to a detection result of the second touch detection procedure.

The first touch detection procedure can be a first acoustic wave type touch detection procedure or a first capacitive type touch detection procedure, and the second touch detection procedure can be a second acoustic wave type touch detection procedure or a second capacitive type touch detection procedure. Besides, the present invention can provide single-side touch operation or double-side touch operation, and the first electrode group 200 and the active matrix unit 210 can have a same touch detection mode or different touch detection modes.

Besides, the first electrode group 200 and the active matrix unit 210 can be used for detecting a touch operation on a single touch zone of the intelligent touch sensing device, or for detecting two touch operations separately on a first touch zone and a second touch zone of the intelligent touch sensing device, and the first touch zone and the second touch zone can be on a same plane or on different planes.

Besides, the touch detection unit 230 can perform a data fusion procedure on first touch sensed data derived from the first electrode group 200 and on second touch sensed data derived from the active matrix unit 210 to generate data of a fusion image, wherein both the first touch sensed data and the second touch sensed data are raw data of sensed values generated without going through a touch coordinate determining procedure.

Figure 9A:
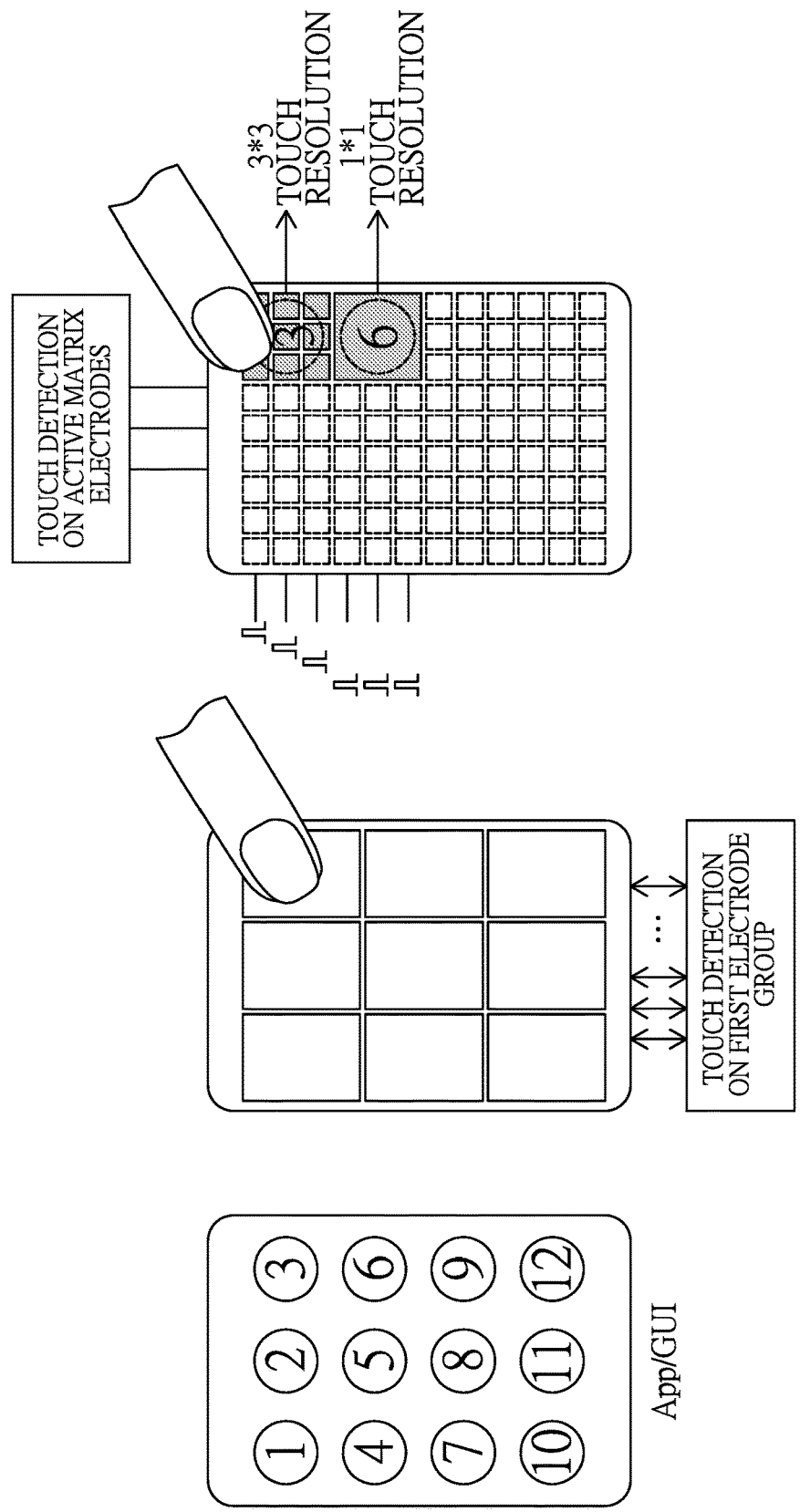
FIG. 9a-9f illustrates 6 applications of the intelligent touch sensing device of the present invention.
Figure 9B:
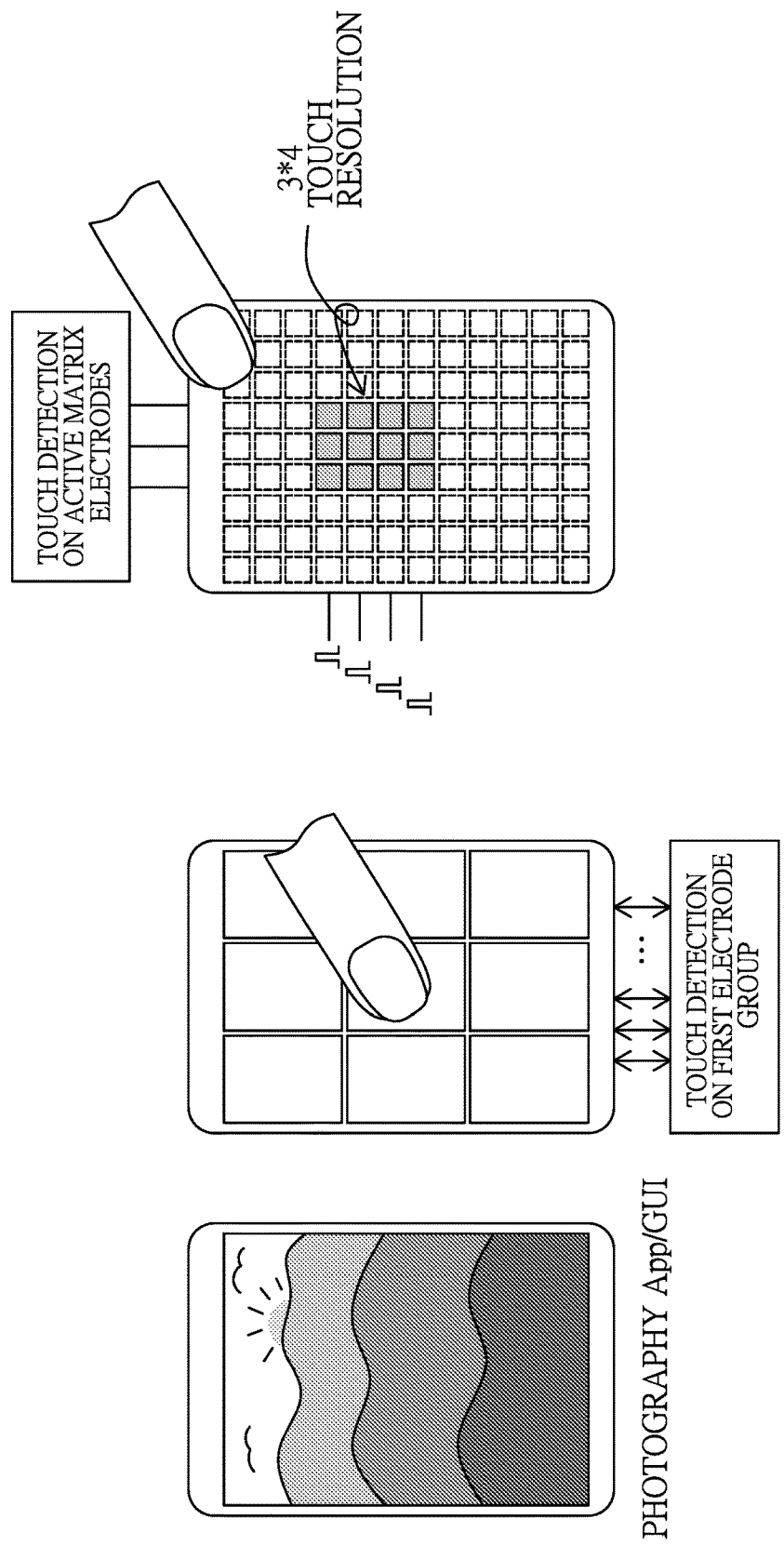
Figure 9C:
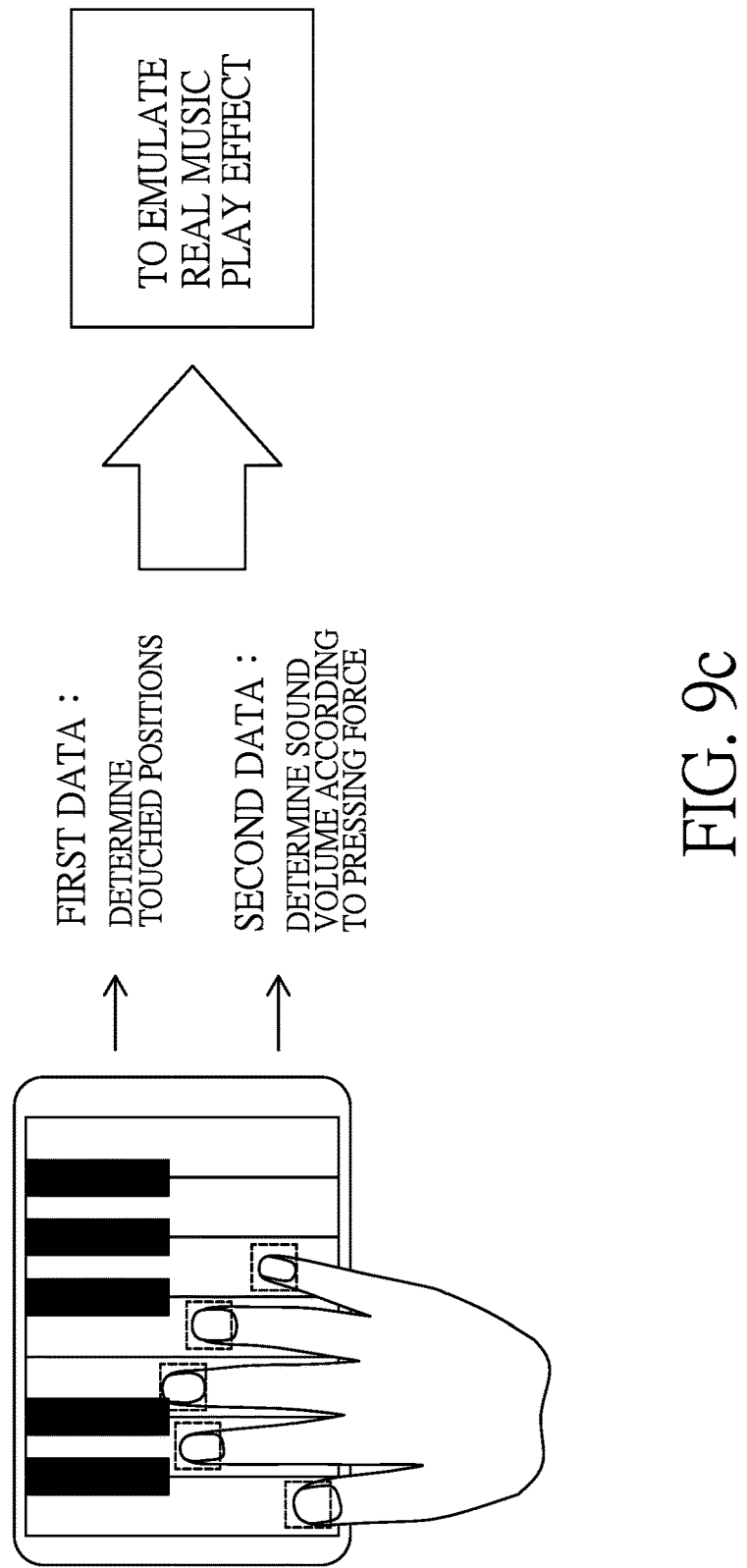
Figure 9D:
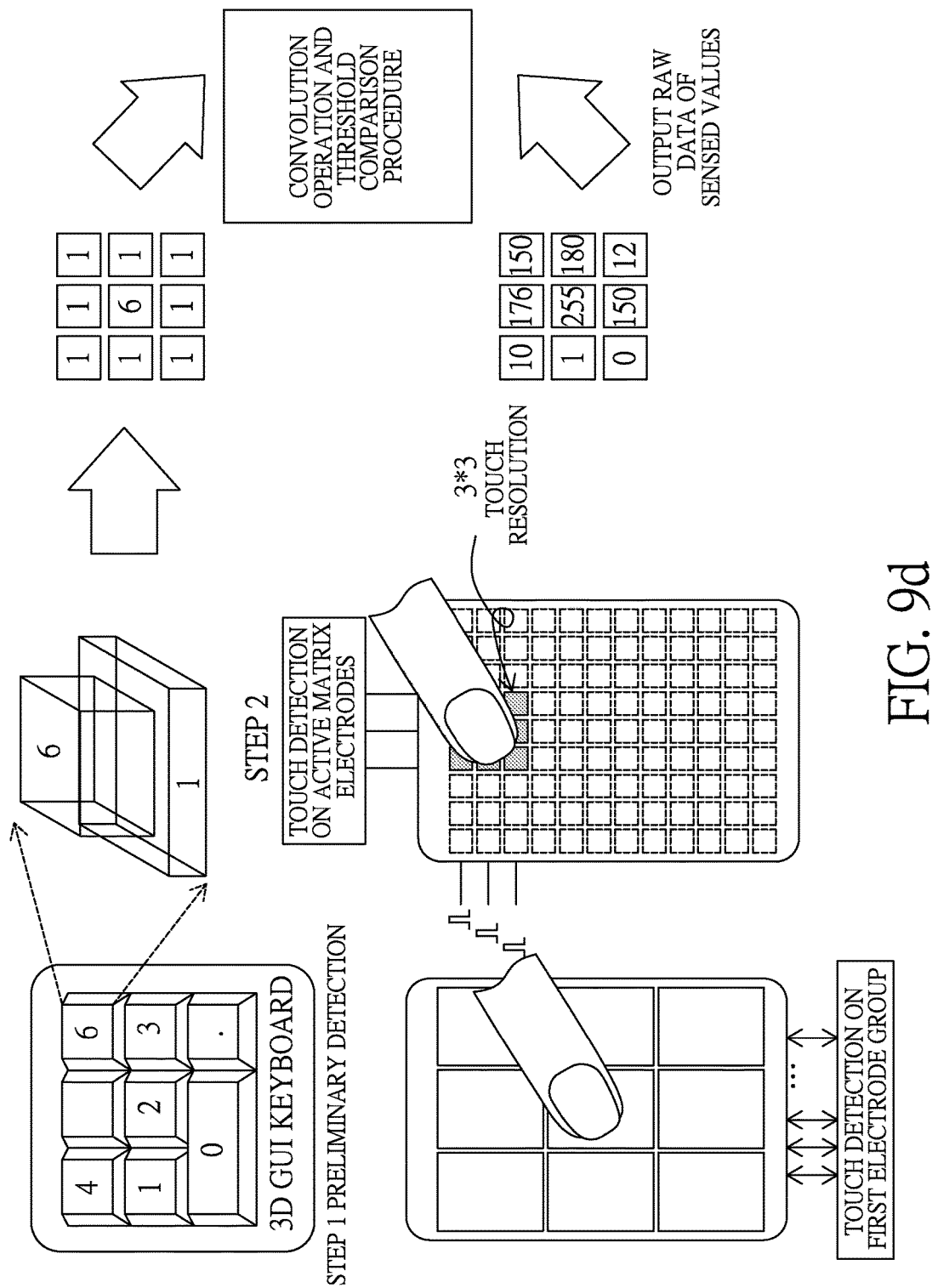
Figure 9E:
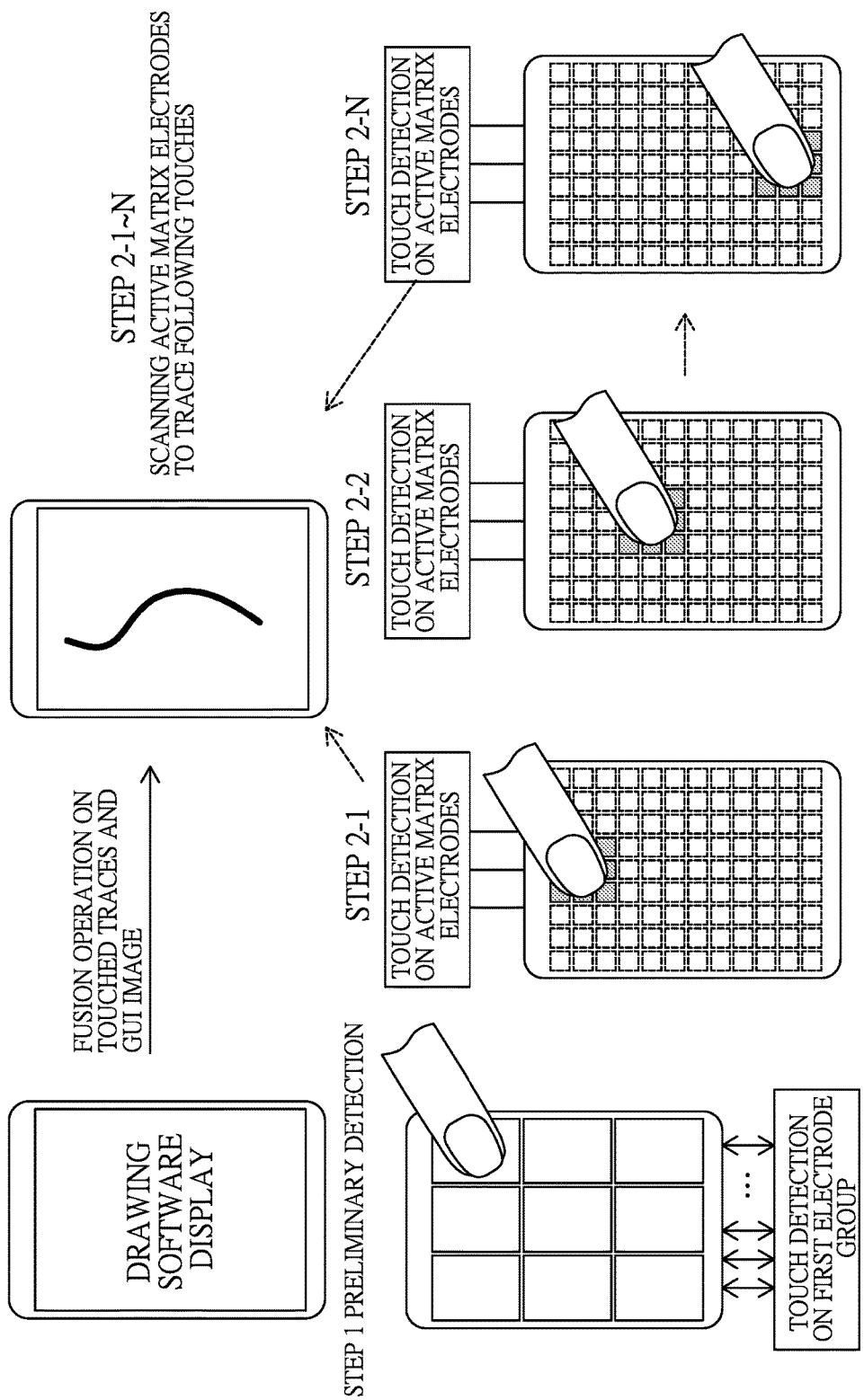
Figure 9F:
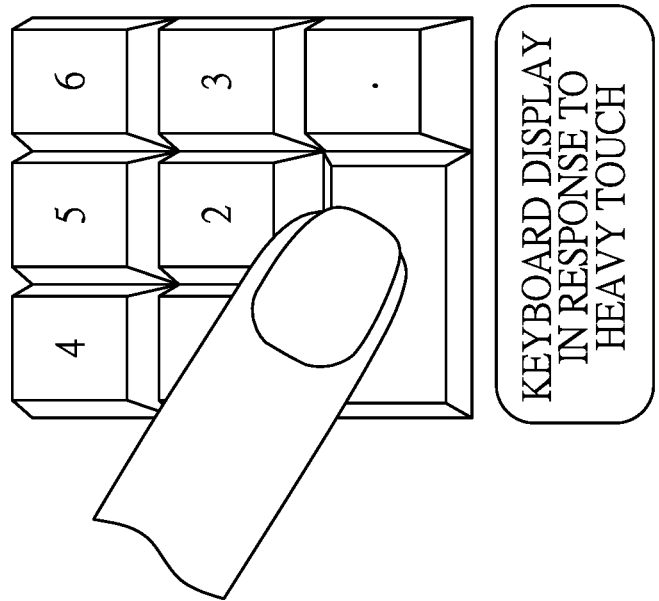
Figure 9F:
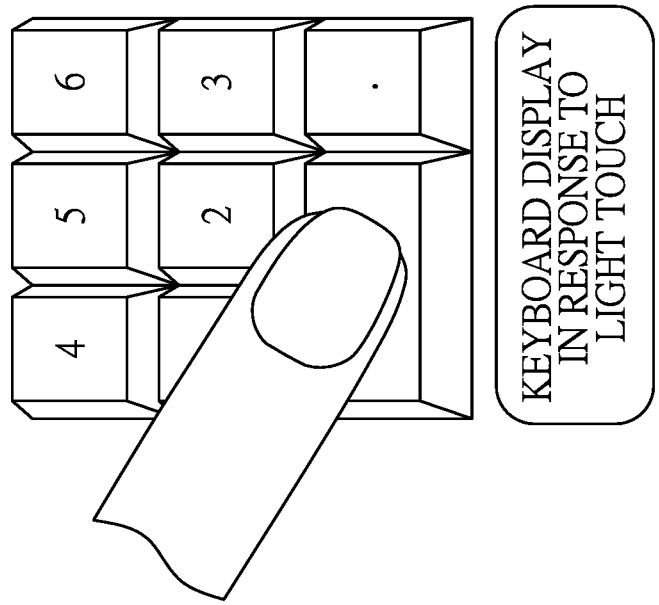

Please refer to FIG. 9*a*-9*f*, which illustrates 6 applications of the intelligent touch sensing device of the present invention, wherein, FIG. 9*a* illustrates a scenario that the intelligent touch device of the present invention sets a touch resolution and shapes of effective sensing units (formed by a plurality of the second electrodes) by driving the gate of switches and the connection circuit in accordance with a requirement of an APP (application program) or GUI (graphic user interface); FIG. 9*b* illustrates a scenario that the intelligent touch device of the present invention provides a focus adjusting function or a shutter button function according to different pressing forces; FIG. 9*c* illustrates a scenario that the intelligent touch device of the present invention provides a music play effect of different volumes of sound in response to different pressing forces; FIG. 9*d* illustrates a scenario that the intelligent touch device of the present invention provides a 3D touch function by using 3D GUI weightings to mask the raw data of sensed values to perform a convolution operation; FIG. 9*e* illustrates a scenario that the intelligent touch device of the present invention provides a touch drawing function by performing a fusion operation on detected touch traces and a GUI image, wherein the intelligent touch device detects touches on the first electrode group first, and then detects following touches on the active matrix unit; and FIG. 9*f* illustrates a scenario that the intelligent touch device of the present invention provides different displays for a GUI object and executing different corresponding procedures in response to different pressing forces.

In addition, the intelligent touch device of the present invention can be applied to a curved touch sensing device or a flexible or foldable touch sensing device by utilizing organic transistors and a flexible substrate.

Thanks to the schemes disclosed above, the present invention can provide the advantages as follows:

1. The intelligent touch sensing device of the present invention can integrate a high resolution active type sensing structure and a low resolution passive type sensing structure into a touch detection device, so as to perform a first touch detection procedure and/or a second touch detection procedure as optionally required by an application program.

2. The intelligent touch sensing device of the present invention can provide fingerprint data or fingerprint characteristic data.

3. Another objective of the present invention is to disclose an intelligent touch sensing device, which is capable of providing sensed pressure data.

4. The intelligent touch sensing device of the present invention can utilize existing control lines, signal lines, transistor switches, pixel electrodes, and counter electrodes of a matrix display structure to perform a touch detection procedure, thereby providing a high yield rate and low cost touch sensing device.

5. The intelligent touch sensing device of the present invention can provide a joystick style operation zone within a touch detection area.

6. The intelligent touch sensing device of the present invention can be implemented in a form of a curved touch sensing device or a flexible or foldable touch sensing device by utilizing a manufacturing process for organic transistors and a flexible substrate.

In addition, compared with the schemes of prior art, the scheme of the present invention that uses a passive touch sensing layer to cooperate with an active matrix unit is not only capable of simultaneously meeting the requirements of high resolution display and high resolution touch sensing with a shorter touch detection time, but capable of using less conductive lines and pads and requiring fewer manufacturing masks.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. An intelligent touch sensing device, including:
a first electrode group having a first plurality of first electrodes;
a second electrode group having a second plurality of second electrodes, each of the second electrodes being controlled by at least one active switch to determine whether to couple with a touch sensing signal, and the second plurality being larger than the first plurality; and
a touch detection unit coupled with the first electrode group and the second electrode group, used for operating according to an application program to optionally perform a first touch detection procedure on the first electrode group, perform a second touch detection procedure on the second electrode group, or perform the first detection procedure on the first electrode group and then perform the second touch detection procedure on at least one region of the second electrode group, wherein the at least one region is determined according to a detection result of the first touch detection procedure.

2. The intelligent touch sensing device as disclosed in claim 1, wherein the first electrode group and the second electrode group are on a same plane or on different planes, and the first touch detection procedure is a first acoustic wave type touch detection procedure or a first capacitive type touch detection procedure or a first electromagnetic induction type touch detection procedure, and the second touch detection procedure is a second acoustic wave type touch detection procedure or a second capacitive type touch detection procedure or a second electromagnetic induction type touch detection procedure.

3. The intelligent touch sensing device as disclosed in claim 1, wherein the touch detection unit outputs first touch sensed data of the first electrode group and/or second touch sensed data of the second electrode group, and/or fusion data of the first touch sensed data and the second touch sensed data.

4. The intelligent touch sensing device as disclosed in claim 3, wherein both the first touch sensed data and the second touch sensed data are touch coordinate data, or the first touch sensed data are touch coordinate data and the second touch sensed data are raw data of sensed values that are generated without going through a touch coordinate determining procedure, or both the first touch sensed data and the second touch sensed data are raw data of sensed values that are generated without going through a touch coordinate determining procedure, or both the first touch sensed data and the second touch sensed data are processed data of raw data of sensed values.

5. The intelligent touch sensing device as disclosed in claim 1, wherein the application program is a fingerprint detection program, and the touch detection unit generates fingerprint data after executing the fingerprint detection program, wherein, the fingerprint data are raw data derived after the touch detection unit executes the first touch detection procedure and the second touch detection procedure, the raw data being not coordinate data generated by a touch coordinate determining procedure; or the fingerprint data are processed data derived after the touch detection unit executes the first touch detection procedure, the second touch detection procedure, and a fingerprint characteristics retrieving procedure.

6. The intelligent touch sensing device as disclosed in claim 1, wherein the application program is a pressure detection program for generating pressure value data and/or pressure vector data according to raw data of sensed values derived after performing the first touch detection procedure and the second touch detection procedure, the raw data being generated without going through a touch coordinate determining procedure.

7. The intelligent touch sensing device as disclosed in claim 1, wherein the touch detection unit generates pressure value data and/or coordinate data according to a detection result of the first touch detection procedure, and generates fingerprint data and/or fingerprint characteristics data according to a detection result of the second touch detection procedure.

8. The intelligent touch sensing device as disclosed in claim 1, wherein the touch detection unit generates coordinate data according to a detection result of the first touch detection procedure, and generates fingerprint characteristics data and/or pressure value data according to a detection result of the second touch detection procedure.

9. An intelligent touch sensing device, including:
a first electrode group having a first plurality of first electrodes;
an active matrix unit having a second plurality of second electrodes, each of the second electrodes being addressable by at least one active switch to serve as a display electrode or a touch sensing electrode, wherein the second plurality is larger than the first plurality;
a display material layer corresponding with a plurality of pixel units, used to be driven by the active matrix unit with voltage signals or current signals to provide a display image during a display procedure; and
a touch detection unit coupled with the first electrode group and the active matrix unit, used for operating according to an application program to optionally perform a first touch detection procedure on the first electrode group, perform a second touch detection procedure on the active matrix unit, or perform the first detection procedure on the first electrode group and then perform the second touch detection procedure on at least one region of the active matrix unit, wherein the at least one region is determined according to a detection result of the first touch detection procedure.

10. The intelligent touch sensing device as disclosed in claim 9, wherein the first electrode group and the active matrix unit are on a same plane or on different planes.

11. The intelligent touch sensing device as disclosed in claim 9, wherein the touch detection unit performs the first touch detection procedure on a plurality of the first electrodes corresponding to a plurality of the pixel units not yet driven during the display procedure, the pixel units being set to be sequentially driven during the display procedure.

12. The intelligent touch sensing device as disclosed in claim 9, wherein the first electrodes and the second electrodes are coupled to the touch detection unit and a display driving unit via a multiplexing circuit or a bus circuit, and the first electrodes and the second electrodes are located at two different sides or a same side of the display material layer.

13. The intelligent touch sensing device as disclosed in claim 9, wherein the touch detection unit outputs first touch sensed data of the first electrode group and/or second touch sensed data of the active matrix unit, wherein, both the first touch sensed data and the second touch sensed data are touch coordinate data, or the first touch sensed data are touch coordinate data and the second touch sensed data are raw data of sensed values that are generated without going through a touch coordinate determining procedure, or both the first touch sensed data and the second touch sensed data are raw data of sensed values that are generated without going through a touch coordinate determining procedure.

14. The intelligent touch sensing device as disclosed in claim 9, wherein the application program is a fingerprint detection program, and the touch detection unit generates fingerprint data after executing the fingerprint detection program, wherein, the fingerprint data are raw data derived after the touch detection unit executes the first touch detection procedure and the second touch detection procedure, the raw data being not coordinate data generated by a touch coordinate determining procedure; or the fingerprint data are processed data derived after the touch detection unit executes the first touch detection procedure, the second touch detection procedure, and a fingerprint characteristics retrieving procedure.

15. The intelligent touch sensing device as disclosed in claim 9, wherein the application program is a pressure detection program for generating pressure value data and/or pressure vector data according to raw data of sensed values derived after performing the first touch detection procedure and the second touch detection procedure, the raw data being generated without going through a touch coordinate determining procedure.

16. The intelligent touch sensing device as disclosed in claim 9, wherein the touch detection unit generates pressure value data and/or coordinate data according to a detection result of the first touch detection procedure, and generates fingerprint data and/or fingerprint characteristics data according to a detection result of the second touch detection procedure.

17. The intelligent touch sensing device as disclosed in claim 9, wherein the touch detection unit generates coordinate data according to a detection result of the first touch detection procedure, and generates fingerprint characteristics data and/or pressure value data according to a detection result of the second touch detection procedure.

18. The intelligent touch sensing device as disclosed in claim 9, wherein the first touch detection procedure is a first acoustic wave type touch detection procedure or a first capacitive type touch detection procedure, and the second touch detection procedure is a second acoustic wave type touch detection procedure or a second capacitive type touch detection procedure.

19. The intelligent touch sensing device as disclosed in claim 9, wherein the first electrode group and the active matrix unit are used for detecting a touch operation on a single touch zone of the intelligent touch sensing device, or for detecting two touch operations separately on a first touch zone and a second touch zone of the intelligent touch sensing device, and the first touch zone and the second touch zone are on a same plane or on different planes.

20. The intelligent touch sensing device as disclosed in claim 9, wherein the touch detection unit performs a data fusion procedure on first touch sensed data derived from the first electrode group and on second touch sensed data derived from the active matrix unit to generate data of a fusion image, wherein both the first touch sensed data and the second touch sensed data are raw data of sensed values generated without going through a touch coordinate determining procedure.

* * * * *